United States Patent Office 3,829,394
Patented Aug. 13, 1974

3,829,394
FLAME RETARDANT COMPOSITION
Maria Feiner, Henin Lietard, Michel Gubler, Paris, and Joseph Guillon, Meurchin, France, assignors to Monsanto Company, St. Louis, Mo.
No Drawing. Original application Sept. 10, 1970, Ser. No. 71,238, now Patent No. 3,677,942. Divided and this application Mar. 1, 1972, Ser. No. 231,039
Claims priority, application France, Sept. 12, 1969, 6931182
Int. Cl. C09k 3/28
U.S. Cl. 260—4 AR                 10 Claims

ABSTRACT OF THE DISCLOSURE

Self-extinguishing plastic materials are prepared by incorporating in the plastic a composition of an organic bromine compound, an organic phosphate and a lead salt.

---

This application is a division of applicants' copending application Ser. No. 71,238, filed Sept. 10, 1970, now U.S. 3,677,942.

This invention relates to a flame-retardant formulation and to polyvinylaromatic resin composition incorporating such a flame-retardant formulation.

Vinylaromatic polymers are an important industrial commodity finding a wide range of applications in many diverse fields. It has been observed, however, that such vinylaromatic polymers are often flammable and in consequence, in applications where there is a fire risk, such as for example in electrical appliances and in the building industry, a demand has grown up for self-extinguishing or flame-retardant grades of these polymers. Indeed, in some countries regulations are in force which require the use of self-extinguishing grades of all plastics used in the building industry. It is found, however, that the incorporation of flame-retardant additives often has undesirable side effects, such as for example corrosion of the processing machinery as a result of premature decomposition of the additive. It is also possible for such additives deleteriously to affect the physical properties of the polymer.

Accordingly, the present invention comprises a flame-retardant formulation comprising (a) either a bromine-substituted hydrocarbon having from 2 to 4 carbon atoms and at least 4 bromine atoms in the molecule, or a bromine-substituted phenol having from 2 to 5 bromine atoms in the aromatic nucleus; (b) a tris(bromoalkyl) phosphate wherein the bromoalkyl groups comprise from 2 to 5 carbon atoms and at least 2 bromine atoms; and (c) a lead salt. Other components can of course be present.

The bromine-substituted hydrocarbon can be for example acetylene tetrabromide; 1,2,2,3-tetrabromopropane; 1,1,2,3,4-pentabromobutane or 1,1,2,2,4,4-hexabromobutane. However, the preferred bromine-substituted hydrocarbons are bromine substituted ethanes and propanes and especially acetylene tetrabromide.

Suitable bromine-substituted phenols include for example 2,4-dibromophenol; 2,4,6-tribromophenol and pentabromophenol. The preferred phenols are, however, those having 4 or 5 bromine substituents and of these the most preferred is pentabromophenol.

The tris(bromoalkyl) phosphate component of the mixture is one in which the bromo-alkyl group contains from 2 to 5 carbon atoms and at least 2 bromine atoms. Examples of suitable bromoalkyl groups that can be present in the phosphate include 1,2-dibromoethyl; 2,3-dibromopropyl; 2,3,4-tribromobutyl and 2,2,3,4-tetrabromopentyl. It is preferred, however, that the bromoalkyl group present contains 2 or 3 carbon atoms and 2 bromine atoms. In practice excellent results have been obtained by using tris(2,3-dibromopropyl) phosphate.

Thus the preferred flame-retardant formulations of the invention comprise (a) acetylene tetrabromide or pentabromophenol, (b) tris(2,3-dibromopropyl) phosphate, and (c) a lead salt.

The amount of the bromine-substituted hydrocarbon or phenol present in the formulation can represent for example from 40 to 60 percent of the total weight of the formulation. However, the preferred amount of bromine-substituted hydrocarbon lies in the lower part of the above range, that is to say from 40 to 50 percent by weight of the formulation. By contrast the preferred amount of bromine-substituted phenol lies in the higher part of the above range and especially from 50 to 60 percent of the total weight of the formulation.

The tris(bromoalkyl) phosphate can conveniently be present in the formulation in a percentage of, for example from 30 to 60 percent by weight but in general the formulation comprises from 35 to 55 percent and particularly from 40 to 50 percent by weight of the phosphate.

The amount of lead salt in the formulation often represents from 0.5 to 12 percent by weight of the formulation, but in general, satisfactory formulations of the invention comprise a lead salt in a proportion of from 1 to 10 percent and particularly from 1 to 8 percent by weight.

The lead salt is most suitably a basic salt that is to say one in which each molecule of the salt is associated with one or more molecules of lead oxide or lead hydroxide. Thus, the lead salt can be a basic form of a salt such as lead carbonate, lead sulphate, lead silicate, lead stearate or lead phthalate. Particularly preferred among these are tribasic lead sulphate, dibasic lead stearate and monobasic lead stearate. The lead salt component of the formulation can of course comprise a mixture of such salts and in fact a preferred composition comprises a mixture of tribasic lead sulphate and dibasic lead stearate in which the ratio of tribasic lead sulphate to dibasic lead stearate is from 9:1 to 2:1 and especially about 4:1.

The invention also comprises a polyvinylaromatic resin composition comprising the flame-retardant formulation described above. The amount of flame-retardant added to the polyvinylaromatic resin depends to some extent on the degree of flame-retardance required and the constituents of the flame-retardant additive, however, it is found that efficient flame-retardance is obtained when the resultant proportion by weight of bromine in the resin composition is from 1.5 to 2.0% and especially from 1.6 to 1.8%.

The vinylaromatic polymer is a homopolymer or copolymer of a vinylaromatic monomer, such as for example styrene, a chlorostyrene, a vinyl toluene, or α-methylstyrene. A copolymer can be one of a vinylaromatic monomer with other olefinic monomer, for example acrylonitrile, vinyl chloride, vinyl acetate, methyl acrylate, methyl methacrylate, or ethyl acrylate. It can also be a graft copolymer of one or more monomers on to a polymer, for example a graft of styrene and acrylonitrile on to a natural or synthetic rubber such as a polybutadiene. Those acrylonitrile (butadiene) styrene resins known as ABS are particularly suitable. The acrylonitrile, butadiene or styrene can if desired be wholly or partially replaced by a homologue, for example methacrylonitrile, isoprene and α-methylstyrene or vinyltoluene respectively. Toughened polystyrenes can be employed, for instance one that has been obtained by modification before or after polymerization with a natural or synthetic rubber especially polybutadiene. Excellent results have been obtained using homopolystyrene or more preferably a toughened polystyrene of the type described above.

The composition may further comprise an antioxidant to retard degradation of the material during fabrication and during exposure to oxidizing conditions while in use. Typical among the many suitable antioxidants which can be employed are alkylated phenols, such as for example 2,6-ditertiarybutyl-p-cresol. Where such an antioxidant is used it is usually found sufficient to add up to one part, for example from .1 to .5 part by weight of antioxidant for every 100 parts by weight of the polyvinylaromatic resin.

Other additives such as for example mold release agents, flow improvers, light stabilizers, slip additives and antistatic additives can also be present if desired.

Where the composition comprises a substance such as acetylene tetrabromide that is a liquid at room temperature, it is found that the incorporation of the additives into the polymer can best be accomplished by absorbing the substance on to finely divided silica and incorporating a master-batch of the additives into the polyvinylaromatic resin. If, however, only substances that are solid at room temperature are used, it is possible to dispense with the silica.

The invention is further illustrated by the following examples.

EXAMPLE 1

This example compares a self-extinguishing grade of rubber modified polystyrene prepared according to the invention with a similar but non-self-extinguishing grade of rubber modified polystyrene.

A rubber-modified polystyrene, comprising 2.4% by weight of rubber, was divided into the samples.

One sample was made self-extinguishing by incorporating into it the additives shown below and the other sample was retained as a blank.

| | Percent |
|---|---|
| Tris(2,3-dibromopropyl) phosphate | 1 |
| Pentabromophenol | 1.35 |
| Tribasic lead sulphate | 0.03 |
| Dibasic lead sulphate | 0.007 |
| 2,6-Ditertiarybutyl-4-methyl-phenol | 0.3 | all proportions being by weight of the sample. The samples were extruded through a 150 mm. diameter extruder at 240 to 250° C. without trouble.

The properties of the self-extinguishing composition formulated according to the invention as shown above were compared with those of the blank and the results of the tests are shown below.

| | Self-extinguishing composition | Blank |
|---|---|---|
| 1 Tensile strength at yield (p.s.i.) | 4,165 | 3,640 |
| 2 Tensile strength at fail (p.s.i.) | 4,525 | 4,030 |
| 3 Elongation at failure (percent) | 29 | 24.5 |
| 4 Izod impact strength (ft. lb./in) | 0.60 | 0.61 |
| 5 Heat distortion (° C.) | 72.5 | 73 |
| 6 Burning rate (cm./min.) | (1) | 3.5 |
| 7 Extinction time (sec.) | 8 | (2) |
| 8 Extent of burning (mm.) | 3.5 | Total |
| 9 Injection temperature, ° C. | 190 | 200 |

[1] Self-extinguishing.
[2] Burned.

The above properties were determined according to the following methods: properties 1–3 by ASTM D638–61 T; property 4 by ASTM D256–56; property 5 by ASTM D648–56; and properties 6–8 by ASTM D635. Property 9, the "injection temperature" is the temperature of the molten material inside the barrel of a screw injection molding machine being used to mold the test specimens.

This shows that the composition of the invention posessed excellent flame-retardant properties while at the same time retaining substantially the same physical properties as the blank.

EXAMPLE 2

The example compares a self-extinguishing grade of rubber-modified polystyrene prepared according to the invention, using acetylene tetrabromide, with a similar but non-self-extinguishing rubber modified polystyrene.

A master-batch identical to the one described in Example 1 was prepared and divided into two samples. One was kept as a blank and to the other was added the following:

| | Percent |
|---|---|
| Acetylene tetrabromide | 1 |
| Tris(2,3-dibromopropyl) phosphate | 1 |
| Silica (as a base on which the acetylene tetrabromide was absorbed) | 0.4 |
| Tribasic lead sulphate | 0.112 |
| Dibasic lead stearate | 0.028 |
| Monobasic lead stearate | 0.010 |
| Magnesium stearate | 0.2 | all proportions being by weight of the sample.

The properties of the two samples were then evaluated using test methods described in Example 1, with the following results:

| | Self-extinguishing composition | Blank |
|---|---|---|
| 1 Tensile strength at yield (p.s.i.) | 4,185 | 3,500 |
| 2 Tensile strength at failure (p.s.i.) | 4,500 | 4,000 |
| 3 Elongation at failure | 23 | 24 |
| 4 Izod impact strength (ft. lb./in.) | 0.64 | 0.63 |
| 5 Heat distortion (° C.) | 74.5 | 76 |
| 6 Burning rate (cm./min.) | (1) | 3.5 |
| 7 Extinction time (sec.) | 5 | (2) |
| 8 Extent of burning (mm.) | 10 | Total |
| 9 Injection temperature (° C.) | 180–185 | 200 |

[1] Non-burning.
[2] Burned.

Again the physical properties of both formulations were similar but the one prepared according to the invention had excellent flame-retardant properties.

EXAMPLE 3

This example compares a homopolystyrene composition according to the invention with an untreated homopolystyrene.

Two identical samples of homopolystyrene were obtained. One sample was blended with the following additives:

| | Percent |
|---|---|
| Tris(2,3-dibromopropyl) phosphate | 1 |
| Pentabromophenol | 1.35 |
| Lead sulphate | 0.03 |
| Lead stearate | 0.007 | all percentages being by weight of the polymer.

The other sample was kept as a blank. Both samples were extruded through a 40 mm. diameter extruder at 180–200° C.

The blended sample assessed according to the methods used in Example 1 had an extinction time of 0.9 sec. and did not burn whereas the blank burned completely.

The physical properties as determined according to the test methods described in Example 1 are set out in the following table.

| | Sample prepared according to the invention | Blank |
|---|---|---|
| 1 Tensile strength at yield (p.s.i.) | 6,300 | 7,400 |
| 2 Tensile strength at failure (p.s.i.) | 6,300 | 7,400 |
| 3 Elongation at failure (percent) | 2 | 2 |
| 4 Izod strength (ft. lb./in.) | 0.20 | 0.24 |
| 5 Heat distortion (° C.) | 82 | 85 |

As before the physical properties are not seriously affected but the self-extinguishing character of the resin composition is much improved.

EXAMPLE 4

This example compares self-extinguishing grades of rubber-modified polystyrene prepared according to the invention, with a similar rubber-modified polystyrene which does not contain a lead salt.

A rubber-modified polystyrene, comprising 2.4% by weight of rubber was divided into three samples.

The following quantities of additives were incorporated in one of the samples:

| | Percent |
|---|---|
| Acetylene tetrabromide | 1 |
| Tris(2,3-dibromopropyl) phosphate | 1 |
| Silica (as a base on which the acetylene tetrabromide was absorbed) | 0.4 |
| Magnesium stearate | 0.2 | all proportions being by weight of the sample.

In the remaining samples there was incorporated the above quantities of the additives together with various proportions of lead salts, as shown in the Table below.

The samples were extruded through a 40 mm. diameter extruder at 180° C. to 200° C.

TABLE

| | Lead salt, percent | Burning temp., °C. | Extinction time, seconds | Extent of burning, millimeters |
|---|---|---|---|---|
| Sample: | | | | |
| 1 | 0 | 150 | 1-2 | 3-6 |
| 2 | 0.11 | 170 | 3 | 6 |
| 3 | 0.21 | 190 | 9 | 12 |

The burning temperature was evaluated by noticing the molding temperature at which black burning marks appeared on injection molded plaques employing an Arburg Allrounder 200 S molding machine.

It can be seen from the results in the Table that the presence of lead salts in the compositions of the present invention gives a product having improved general properties over the non-lead-salt containing composition. The increase in burning temperatures that is due to the presence of the lead salts represents a significantly improved composition. Slight increases in the values of the extinction time and extent of burning of these compositions do not signify a noticeable deterioration in these properties and in fact the values shown represent excellent properties.

While this invention has been described with respect to certain embodiments, it is not so limited, and it should be understood that variations and modifications may be made which are obvious to those skilled in the art without departing from the spirit or scope of the invention.

We claim:

1. A resin composition comprising a polyvinylaromatic resin and a flame-retardant formulation comprising (a) a bromine-substituted hydrocarbon having from 2 to 4 carbon atoms and at least 4 bromine atoms, or a bromine-substituted phenol having from 2 to 5 bromine atoms in the aromatic nucleus, (b) a tris(bromoalkyl) phosphate wherein the bromoalkyl groups comprise from 2 to 5 carbon atoms and at least 2 bromine atoms, and (c) a lead salt.

2. A resin composition according to Claim 1, in which the polyvinylaromatic resin is selected from the group consisting of a homopolymer or copolymer of styrene.

3. A resin composition according to Claim 1, in which the resin is a polystyrene modified before or after polymerization with a natural or synthetic rubber.

4. A resin composition according to Claim 1, in which the amount of flame-retardant formulation present is sufficient to provide a percentage of bromine in the resin composition of from 1.5 to 2.0%.

5. A resin composition according to Claim 1 which further comprises a phenolic antioxidant.

6. A resin composition according to Claim 5 in which the antioxidant is 2,6-ditertiary butyl-p-cresol.

7. A resin composition according to Claim 5 in which there is up to 1 part by weight of antioxidant for every 100 parts by weight of the polyvinylaromatic resin.

8. A resin composition according to Claim 2, in which the polyvinylaromatic resin is an acrylonitrile/butadiene/styrene (ABS) resin.

9. An article fabricated from a resin composition according to Claim 1.

10. An article fabricated from a resin composition according to Claim 8.

References Cited

UNITED STATES PATENTS

| 2,610,920 | 9/1952 | Hopkinson | 106—15 |
| 2,676,946 | 4/1954 | McCurdy et al. | 260—45.75 |
| 2,912,397 | 11/1959 | Houska et al. | 260—23 |
| 3,058,926 | 10/1962 | Eichhorn | 260—2.5 |
| 3,372,141 | 3/1968 | Dickerson et al. | 260—45.95 |
| 3,385,819 | 5/1968 | Gouinlock, Jr. | 260—45.75 |
| 3,418,263 | 12/1968 | Hindersinn et al. | 260—23 |
| 3,420,786 | 1/1969 | Weber et al. | 260—2.5 |
| 3,445,404 | 5/1969 | Ronden et al. | 260—2.5 |
| 3,637,555 | 1/1972 | Marinacci et al. | 260—23.7 |
| 3,639,304 | 2/1972 | Raley, Jr. | 260—2.5 |

OTHER REFERENCES

Hilado, Flammability Handbook for Plastics, 1969, pp. 85 and 86.

DONALD E. CZAJA, Primary Examiner

R. A. WHITE, Assistant Examiner

U.S. Cl. X.R.

260—45.7 P, 45.7 R, 45.75 R, 45.95 H, 45.95 R, 876 R, 880 R, 892